United States Patent
Hammer et al.

(10) Patent No.: US 12,441,169 B1
(45) Date of Patent: Oct. 14, 2025

(54) VEHICLE FRUNK ASSEMBLIES

(71) Applicant: Toyota Motor Engineering & Manufacturing North America, Inc., Plano, TX (US)

(72) Inventors: Jeremiah T. Hammer, Ann Arbor, MI (US); Aaron Steinhilb, Milan, MI (US); Suk Jae Ham, Ann Arbor, MI (US); Troy N. Grantham, Saline, MI (US); Haley L. Grantham, Saline, MI (US)

(73) Assignees: Toyota Motor Engineering & Manufacturing North America, Inc., Plano, TX (US); Toyota Jidosha Kabushiki Kaisha, Toyota (JP)

(*) Notice: Subject to any disclaimer, the term of this patent is extended or adjusted under 35 U.S.C. 154(b) by 306 days.

(21) Appl. No.: 18/185,688

(22) Filed: Mar. 17, 2023

(51) Int. Cl.
| | |
|---|---|
| *B60J 10/86* | (2016.01) |
| *B60J 10/26* | (2016.01) |
| *B60R 5/02* | (2006.01) |
| *B62D 25/12* | (2006.01) |

(52) U.S. Cl.
CPC ............. *B60J 10/86* (2016.02); *B60J 10/26* (2016.02); *B60R 5/02* (2013.01); *B62D 25/12* (2013.01)

(58) Field of Classification Search
None
See application file for complete search history.

(56) References Cited

U.S. PATENT DOCUMENTS

| | | | |
|---|---|---|---|
| 8,807,637 B2 | 8/2014 | Partsch et al. | |
| 11,628,888 B2* | 4/2023 | Cote | B60R 5/02 |
| | | | 180/69.2 |
| 11,827,180 B2* | 11/2023 | Weber | B62D 25/087 |

FOREIGN PATENT DOCUMENTS

| | | | |
|---|---|---|---|
| DE | 102020133889 B4 | | 9/2022 |
| KR | 20220040089 | * | 3/2022 |
| KR | 102429045 B1 | | 8/2022 |
| KR | 102440797 B1 | | 9/2022 |
| WO | 2018162146 A1 | | 9/2018 |

* cited by examiner

*Primary Examiner* — Joseph D. Pape
(74) *Attorney, Agent, or Firm* — Dinsmore & Shohl LLP

(57) ABSTRACT

A vehicle frunk assembly is provided. The vehicle frunk includes a frunk housing having a bottom wall and a side wall having an interior surface and an opposite exterior surface. The interior surface of the side wall and the bottom wall define a storage space. The vehicle frunk includes a hood moveable between an open position and a closed position. The hood has a hood inner panel. The vehicle frunk includes a sealing flange extending outwardly from the hood inner panel, and the sealing flange has an inner surface and an outer surface. The sealing flange is configured to bound at least a portion of the side wall such that the inner surface of the sealing flange faces the exterior surface of the side wall to form a seal between the hood and the frunk housing when the hood is in the closed position.

10 Claims, 6 Drawing Sheets

VEHICLE FRUNK ASSEMBLIES

TECHNICAL FIELD

The present specification generally relates to vehicle frunk assemblies, more particularly, vehicle frunk assemblies having sealing flanges to seal frunk storage spaces.

BACKGROUND

Various storage spaces are used for vehicles to store items. Some vehicle designs allow a space under a front hood for a front trunk (i.e., a frunk). For example, the space for the frunk may be provided when changing from a large front mounted Internal Combustion Engine (ICE) to an electric powertrain. The frunk is a useful storage container for vehicles and customers have grown to expect an environmentally sealed compartment for the stored items. Sealing the frunk may need a safety feature while providing the environmental seal.

SUMMARY

In one embodiment, a vehicle frunk assembly is provided. The vehicle frunk includes a frunk housing having a bottom wall and a side wall having an interior surface and an opposite exterior surface. The interior surface of the side wall and the bottom wall define a storage space. The vehicle frunk includes a hood moveable between an open position and a closed positon. The hood has a hood inner panel. The vehicle frunk includes a sealing flange extending outwardly from the hood inner panel, and the sealing flange has an inner surface and an outer surface. The sealing flange is configured to bound at least a portion of the side wall such that the inner surface of the sealing flange faces the exterior surface of the side wall to form a seal between the hood and the frunk housing when the hood is in the closed position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to vehicles vehicle having vehicle frunk assemblies that includes a vehicle frunk. The vehicle frunk may have a storage space defined by a frunk housing and a hood disposed above the storage space. Thee storage space is sealed from a surrounding environment by a sealing flange. The sealing flange extends downward from an inner surface of a hood inner panel of the hood, and the frunk housing has a side wall that extends upward from the frunk housing toward the inner surface of the hood inner panel. When a force is applied to the hood inner panel directly or indirectly through a hood outer panel or the like, the sealing flange moves downward together with the hood inner panel with respect with to the frunk housing. The increased movement of the hood downward in a vehicle vertical direction may prevent an increase in impact energy applied to an object impacting the hood.

Figure 1:
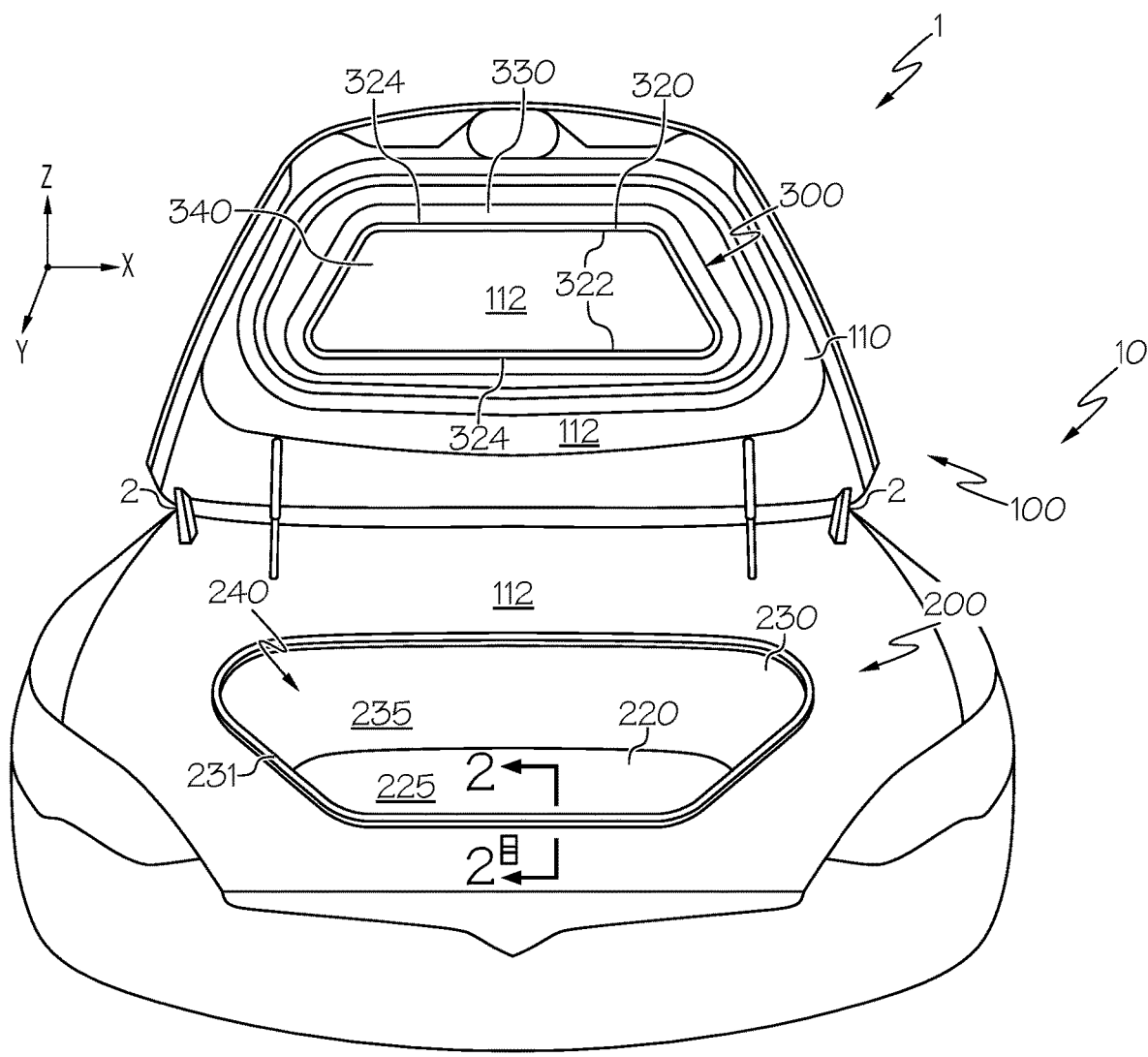
FIG. 1 depicts a front perspective view of a vehicle having a vehicle frunk assembly with a hood in an open position according to one or more embodiments shown and described herein.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper", "upward", and "above" are defined as the positive Z direction of the coordinate axes shown in the drawings. "Lower", "downward", and "below" are defined as the negative Z direction of the coordinate axes shown in the drawings. Further, the terms "outboard" or "outward" as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Figure 2A:
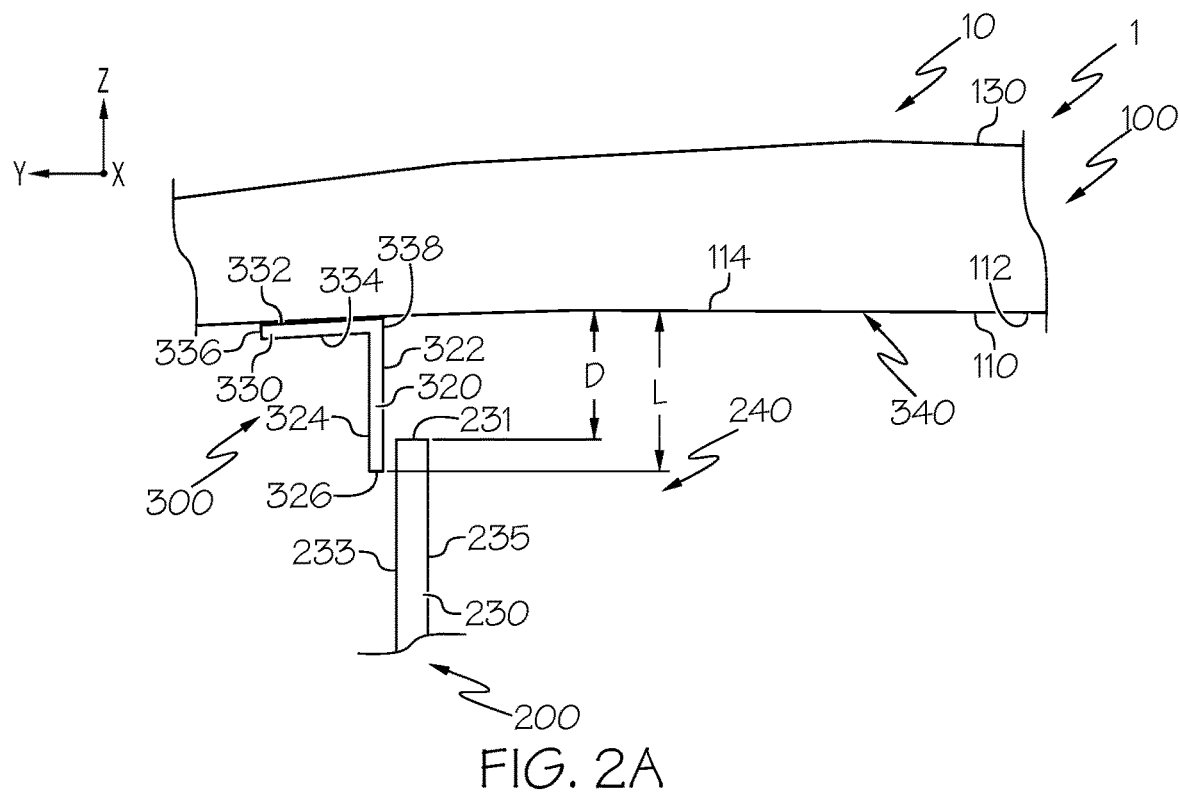
FIG. 2A depicts a partial cross sectional view of the vehicle frunk assembly taken along the line 2-2 of FIG. 1 in a normal position according to one or more embodiments shown and described herein.
Figure 2B:
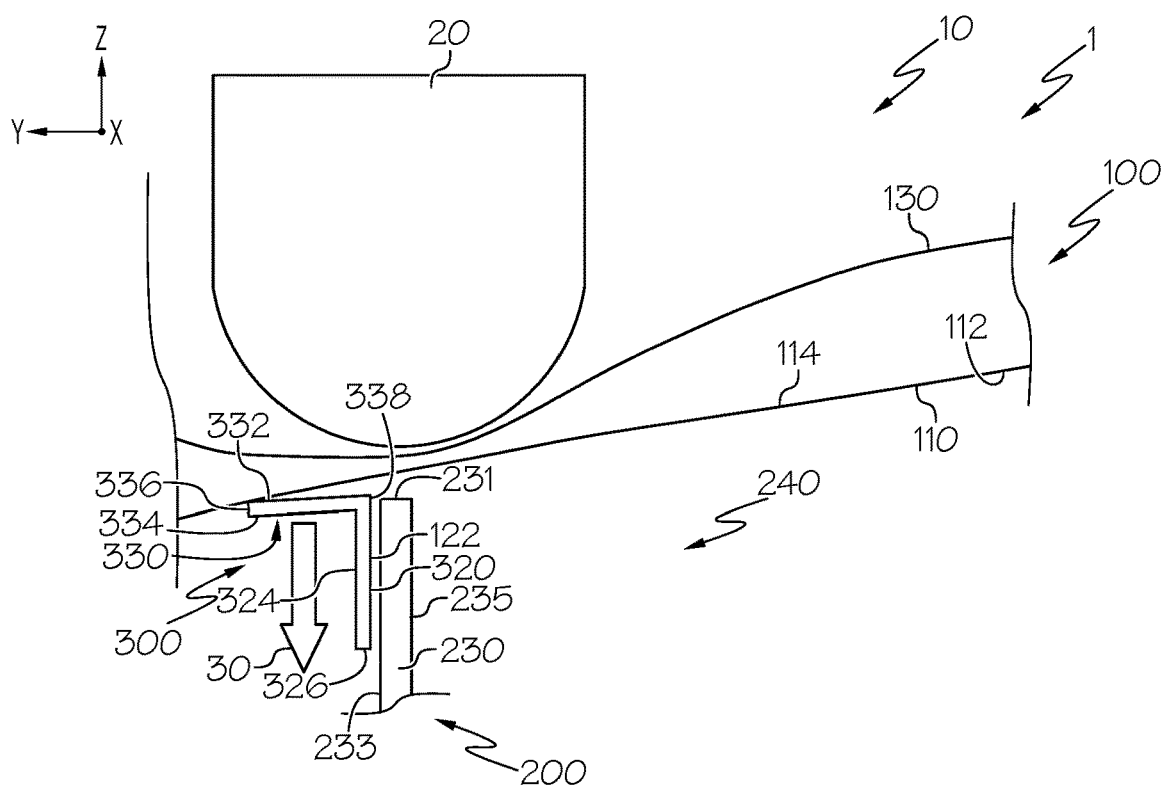
FIG. 2B depicts a partial cross sectional view of the vehicle frunk assembly taken along the line 2-2 of FIG. 1 in an impact position according to one or more embodiments shown and described herein.

Referring now to FIG. 1, a vehicle 1 having a vehicle frunk assembly 10 is depicted. The vehicle frunk assembly 10 includes a hood 100, a frunk housing 200, and a sealing member 300. The hood 100 is moveable between an open position, as shown in FIG. 1, and a closed position, as shown in FIGS. 2A-2C. The frunk housing 200 defines a storage space 240. The sealing member 300 is coupled to the hood 100. As described in greater detail below, the sealing member 300 engages with the frunk housing 200 to seal the storage space 240 of the frunk housing 200 from an exterior environment when the hood 100 is in the closed position.

The hood 100 is hingledly coupled to the vehicle 1 by hinges 2 for movement between the open position and the closed position. In the open position, the hood 100 permits access to the storage space 240 of the frunk housing 200 from an exterior of the vehicle 1. In the closed position, the hood 100 inhibits access to the storage space 240 of the frunk housing 200 from the exterior of the vehicle 1.

The hood 100 includes a hood inner panel 110 and a hood outer panel 130. The hood outer panel 130 faces the exterior environment of the vehicle 1. As such, the hood outer panel 130 forms a portion of an exterior surface of the vehicle 1. The hood inner panel 110 is positioned between the hood outer panel 130 and the frunk housing 200 when the hood 100 is in the closed position. The hood inner panel 110 includes an inner surface 112 and an opposite outer surface 114, as shown in FIGS. 2A-2C. The outer surface 114 of the hood inner panel 110 faces the hood outer panel 130. The inner surface 112 of the hood inner panel 110 faces the storage space 240 of the frunk housing 200 when the hood 100 is in the closed position.

The frunk housing 200 includes a bottom wall 220 and at least one side wall 230 that bounds the bottom wall 220. The bottom wall 220 has an upper surface 225. The bottom wall 220 and the side wall 230 define the storage space 240.

Referring to FIG. 2A, the side wall 230 of the frunk housing 200 has an interior surface 235 and an exterior surface 233 opposite to the interior surface 235. The interior surface 235 faces the storage space 240 such that the interior surface 235 of the side wall 230 and the upper surface 225 of the bottom wall 220 define the storage space 240. In embodiments, the side wall 230 may include an upper edge 231 that defines and bounds an opening of the storage space 240.

In embodiments, the sealing member 300 includes a sealing flange 320 and a base wall 330. The base wall 330 includes a top surface 332 and an opposite bottom surface 334. The top surface 332 is coupled to the inner surface 112 of the hood inner panel 110. For example, the base wall 330 may be coupled to the inner surface 112 of the hood inner panel 110 by bonding, gluing, fastening, or the like. The base wall 330 includes an outer edge 336 and an opposite inner edge 338. In embodiments, the inner edge 338 defines an opening 340. The opening 340 is positioned to as to be above the storage space 240 of the frunk housing 200 when the hood 100 is in the closed position. The opening 340 exposes the inner surface 112 of the hood inner panel 110 to the storage space 240 when the hood 100 is in the closed position. In some embodiments, the sealing member 300 has a generally ring shape with the opening 340 positioned in a center portion of the sealing member 300.

The sealing flange 320 includes has the inner surface 322, an outer surface 324 opposite the inner surface 322, and a distal edge 326. In the closed position, the inner surface 322 of the sealing flange 320 faces the exterior surface 233 of the side wall 230. The sealing flange 320 extends outwardly from the inner edge 338 of the base wall 330. In embodiments, the sealing flange 320 extends outwardly from the base wall 330 so as to be generally normal to the base wall 330. In embodiments, the sealing flange 320 extends from the base wall 330 such that the outer surface 324 of the sealing flange 320 forms an acute angle with the bottom surface 334 of the base wall 330. In embodiments, the inner surface 322 of the sealing flange 320 defines the opening 340 of the sealing member 300.

The opening 340 defined by the inner surface 322 of the sealing flange 320 is formed to so as to have a size larger than the opening of the storage space 240 defined by the upper edge 231 of the side wall 230 of the frunk housing 200. As shown in FIG. 2A, when the hood 100 is in the closed position, the sealing flange 320 is positioned so as bound the side wall 230 such that the inner surface 322 of the sealing flange 320 faces the exterior surface 233 of the side wall 230. Therefore, when the hood 100 is in the closed position, the sealing flange 320 overlaps the side wall 230 such that the sealing flange 320 is positioned exterior to the side wall 230. As such, sealing flange 320 forms a seal for the storage space 240 is sealed by the sealing flange 320 so as to inhibit objects and/or fluids from entering the storage space 240.

Still referring to FIG. 2A, the sealing flange 320 has a length L from the inner surface 122 of the hood inner panel 110 of the hood 100 to the distal edge 326 of the sealing flange 320. When the hood 100 is in the closed position, the upper edge 231 of the side wall 230 is spaced apart a distance D from the inner surface 122 of the hood inner panel 110 of the hood 100. The length L is greater than the distance D. As such, when the hood 100 is in the closed position, the distal edge 326 of the sealing flange 320 is positioned lower in the vehicle vertical direction than the upper edge 231 of the side wall 230.

Still referring to FIG. 2A, when the hood 100 is in the closed position, the inner surface 112 of the hood inner panel 110 of the hood 100 is positioned above the storage space 240 such that the sealing flange 320 and the inner surface 112 of the hood inner panel 110 form a cover or lid that covers the opening of the storage space 240.

In embodiments, the base wall 330 is provided on the hood inner panel 110 so as to bound an exterior of the side wall 230. For example, when the hood 100 is in the closed position, the base wall 330 is positioned exterior and around the side wall 230 such that the base wall 330 is not positioned within the opening defined by the upper edge 231 of the side wall 230. and/or surrounds the side wall 230. As discussed above, the sealing flange 320 is positioned around the exterior surface 233 of the side wall 230 so as to surround a periphery of the exterior surface 233 when the hood 100 is in the closed position.

The sealing flange 320 is configured to bound at least a portion or all of the side wall 230 of the frunk housing 200 such that the inner surface 322 of the sealing flange 320 faces the exterior surface 233 of the side wall 230 to form the seal between the hood 100 and the frunk housing 200 when the hood 100 is in the closed position. Therefore, the storage space 240 may be sealed when the hood 100 is in the closed position. For example, the storage space 240 may be sealed from surrounding environment between the sealing flange 320 and the frunk housing 200, specifically the side wall 230 of the frunk housing 200.

Referring to FIG. 2B, the sealing flange 320 may be configured to move with respect to the upper edge 231 of the side wall 230 upon an application of a force on the hood 100. For example, the force may be applied by an impact from an object 20 on the hood 100. In embodiments, the force may deform the hood outer panel 130 or deform both of the hood outer panel 130 and the hood inner panel 110. In embodiments, when the force is applied, a distance between the hood outer panel 130 and the hood inner panel 110 may decrease. The deformation of the hood outer panel 130 and/or the hood inner panel 110 may absorb some of the force applied to the hood 100. In embodiments, when the force is applied, the entire hood 100, both of the hood outer panel 130 and the hood inner panel 110, may be shifted toward the frunk housing 200. For example, the hood inner panel 110 may free stroke because the sealing flange 320 is positioned around the exterior of the side wall 230 such that the sealing flange 320 translates downward together with the hood inner panel 110. The free stroke of the hood inner panel 110 may reduce sharp increase in impact from the force applied to the hood 100 compared to in case where the sealing flange 320 does not translate with the hood inner panel 110.

In embodiments, when the force is applied, the sealing flange 320 may be moved in a direction 30 (e.g., a downward direction in the vehicle vertical direction). For example, the sealing flange 320 may be moved along with the hood inner panel 110 such that the distance D between the inner surface 112 of the hood inner panel 110 and the upper edge 231 decreases. The direction 30 may be substantially the same with a direction of the force. In embodiments, the seal formed between the sealing flange 320 and the side wall 230 may be maintained while the force is applied. In embodiments, the sealing flange 320 may be deformable to maintain the seal. For example, the sealing flange 320 may be made with a material including a deformable or flexible material (e.g., rubber, plastic, silicon, or the like). The sealing flange 320 may include a plurality of materials molded together or fastened, coupled, or glued together.

FIGS. 3A-3D depict modified vehicle frunk assemblies. Since the detailed description of the vehicle frunk assembly 10 has been made above with reference to FIGS. 1A-2B, the repeated explanation is omitted.

Figure 3A:
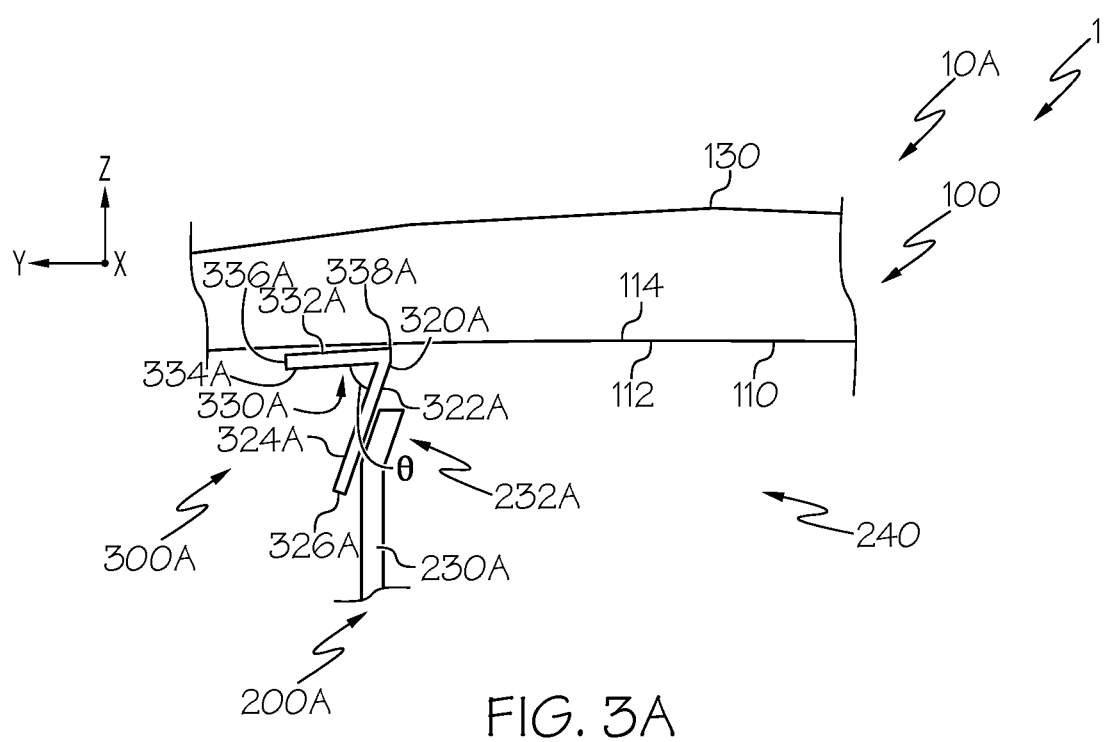
FIG. 3A depicts a partial cross sectional view of a modified vehicle frunk assembly taken along the line 2-2 of FIG. 1 according to one or more embodiments shown and described herein.

Referring to FIG. 3A, in embodiments, a vehicle frunk assembly 10A may include a frunk housing 200A having a side wall 230A having an upper edge portion 232A angled toward the storage space 240 (e.g., an internal space defined by the side wall 230A). An angle Θ between an opposite bottom surface 334A and an outer surface 324A may be an acute angle. The sealing flange 320A may be configured to be angled so as to conform with the upper edge portion 232A. For example, the sealing flange 320A may be deformed by contacting with the upper edge portion 232A with an inner surface 122A. For another example, the sealing flange 320A may be extended from a base wall 330A at an angle substantially conform the upper edge portion 232A. The angled upper edge portion 232A may provide enhanced sealing of the storage space 240 from the surrounding environment.

Figure 3B:
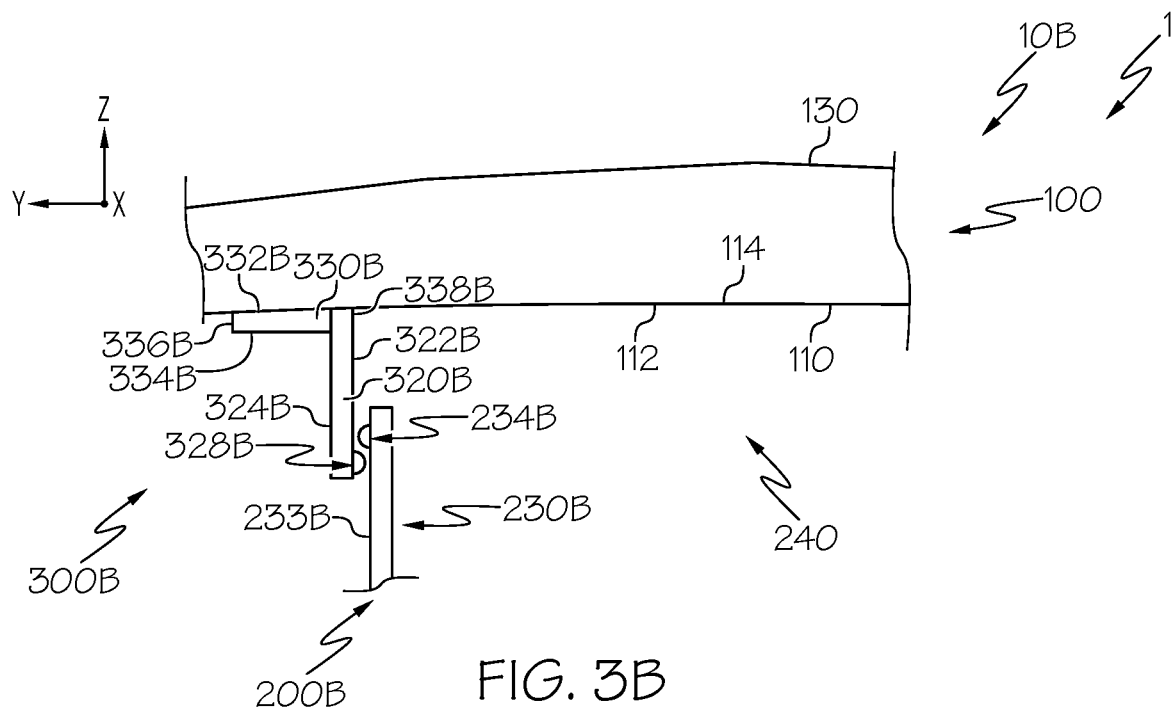
FIG. 3B depicts a partial cross sectional view of another modified vehicle frunk assembly taken along the line 2-2 of FIG. 1 according to one or more embodiments shown and described herein.

Referring to FIG. 3B, in embodiments, a vehicle frunk assembly 10B may include at least one of a seal 328B disposed on an inner surface 322B of a sealing flange 320B and a seal 234B disposed on an exterior surface 233B of a side wall 230B. The seal 328B and the seal 234B may be a protrusion respectively protruded from the inner surface 322B and the exterior surface 233B, respectively. In embodiments, the seal 328B and the seal 234B may be disposed offset from each other in the vehicle vertical direction. For example, the seal 328B is disposed below the seal 234B. When a force is applied to the hood 100 and the sealing flange 320C moves downward, the seal 328B and the seal 234B may not interfere each other during the movement of the sealing flange 320B.

In embodiments, the seal 328B and the seal 234B may be respectively fastened, coupled, or glued on the inner surface 322B and the exterior surface 233B, respectively. In embodiments, the seal 328B and the seal 234B may be made of a flexible material, such as silicon, rubber, foam, or the like. In embodiments, the sealing flange 320B may be formed with a rigid material such as plastic, metal, or the like. In embodiments, the sealing flange 320B may be formed by a two-shot mold process to integrally form the sealing flange 320B with the seal 328B as a one piece monolithic structure. In embodiments, the side wall 230B may be formed by a two-shot mold process to integrally form the side wall 230B with the seal 234B as a one piece monolithic structure. In embodiments, the seal 328B and the seal 234B may be formed as a bulb seal.

Figure 3C:
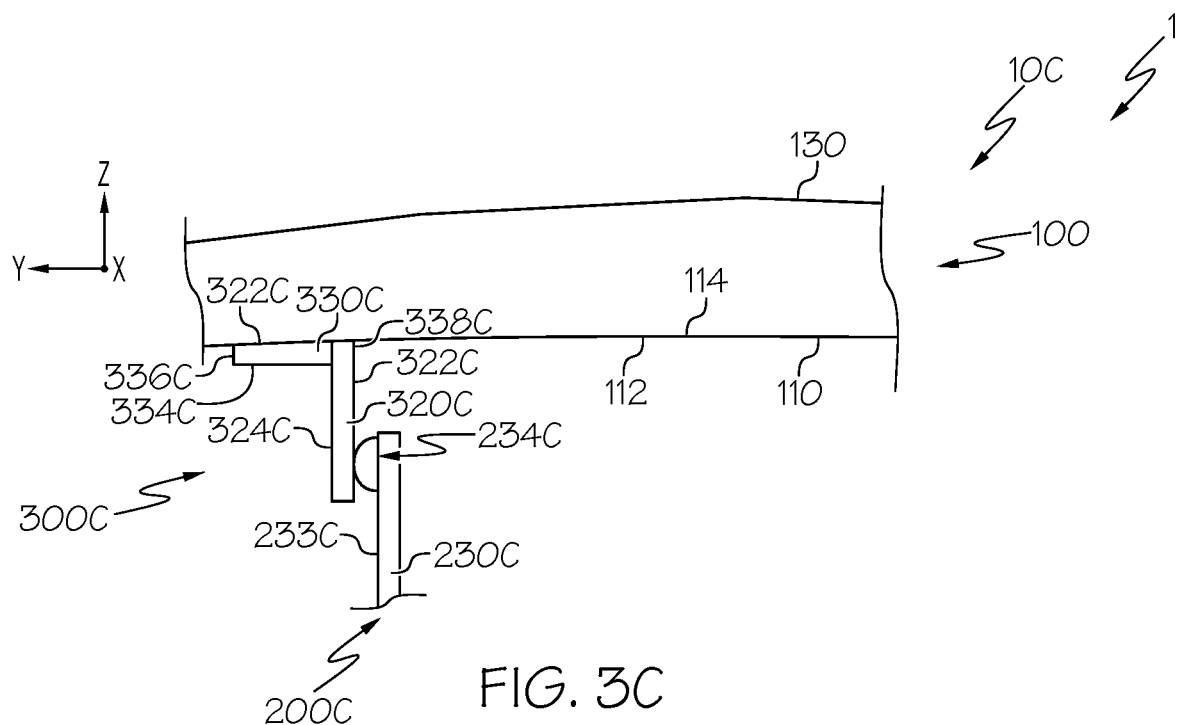
FIG. 3C depicts a partial cross sectional view of another modified vehicle frunk assembly taken along the line 2-2 of FIG. 1 according to one or more embodiments shown and described herein.

Referring to FIG. 3C, in embodiments, a vehicle frunk assembly 10C may include only a single seal 234C disposed on at least one of an inner surface 322C of a sealing flange 320C and an exterior surface 233C of a side wall 230C. In embodiments, the bulb seal 234C may be a closed structure (e.g., an "O" shape or the like) or an open structure (e.g., a "C" shape or the like). In embodiments, the bulb seal 234C may be made of a flexible material, such as silicon, rubber, foam, or the like. In embodiments, the seal 334C may be formed as a bulb seal.

Figure 4:
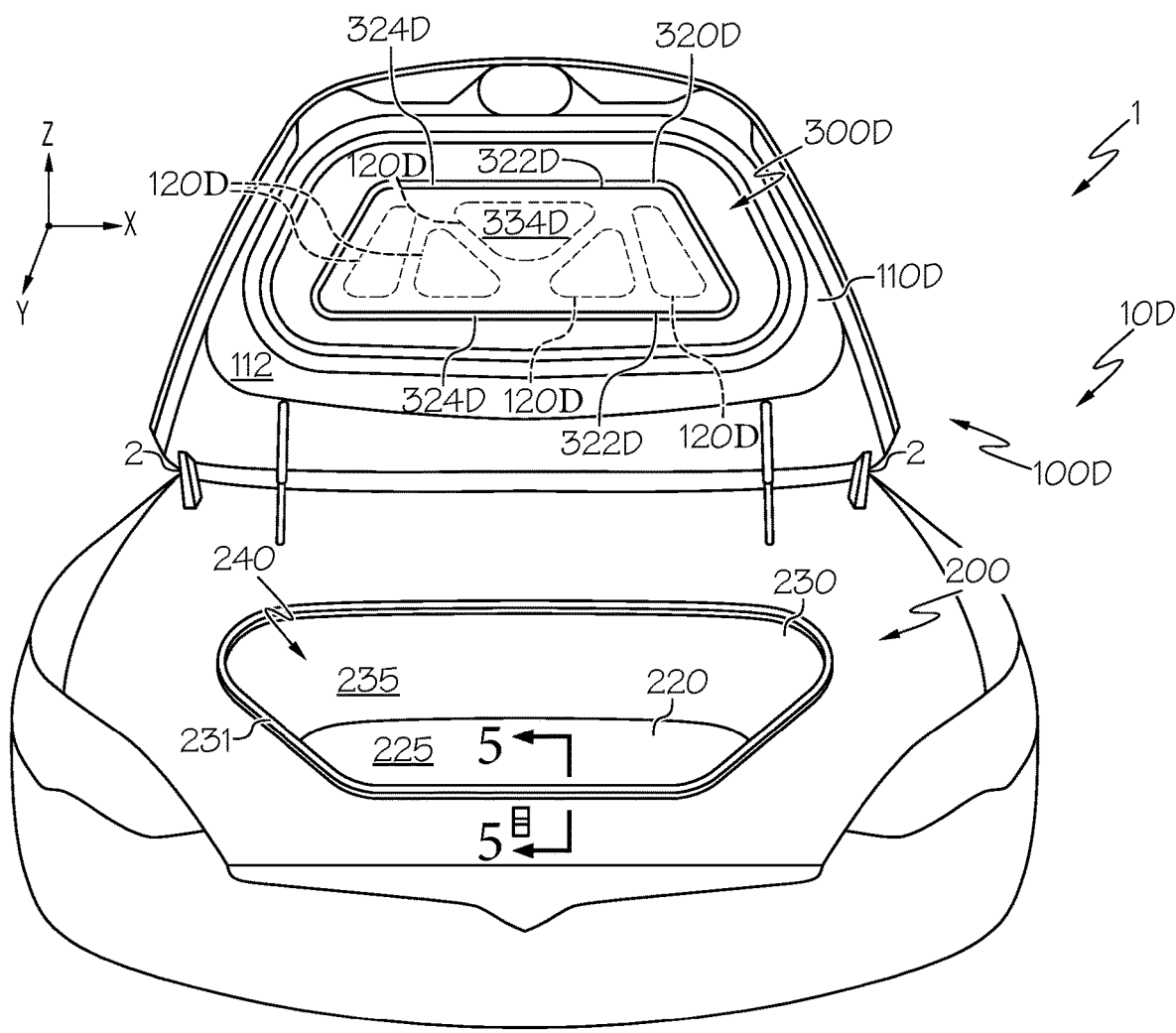
FIG. 4 depicts a perspective view of a vehicle having another vehicle frunk assembly with a hood in an open position according to one or more embodiments shown and described herein.

Referring to now FIG. 4, a vehicle 1D is depicted including a vehicle frunk assembly 10D having a modified hood 100D and a modified sealing member 300D. It should be appreciated that the hood 100D and sealing member 300D are similar to above described hood 100 and sealing member 300 and, therefore, like reference numbers will be used herein to refer to like parts. The vehicle frunk assembly 10D includes the hood 100D, the frunk housing 200, and the sealing member 300D. The hood 100D includes a hood inner panel 110D and a hood outer panel 130D. The hood inner panel 110D includes a plurality of openings 120D that extend between an outer surface 114D and an inner surface 112D. As the openings 112D permit debris and fluids from entering the storage space 240 even when the hood 100D is in the closed position, the sealing member 300 includes a base wall 330D that covers the storage space 240 when the hood 100D is in the closed position. As such, when the hood 100D is in the closed position, base wall 330D is positioned between the inner surface 112D of the hood inner panel 110D and the storage space 240 so as to inhibit debris and fluids from exiting the openings 120D and entering the storage space 240. As shown in FIG. 4, the sealing member 300D acts as a cover to cover the storage space 240 when the hood 100D is in the closed position.

Figure 5:
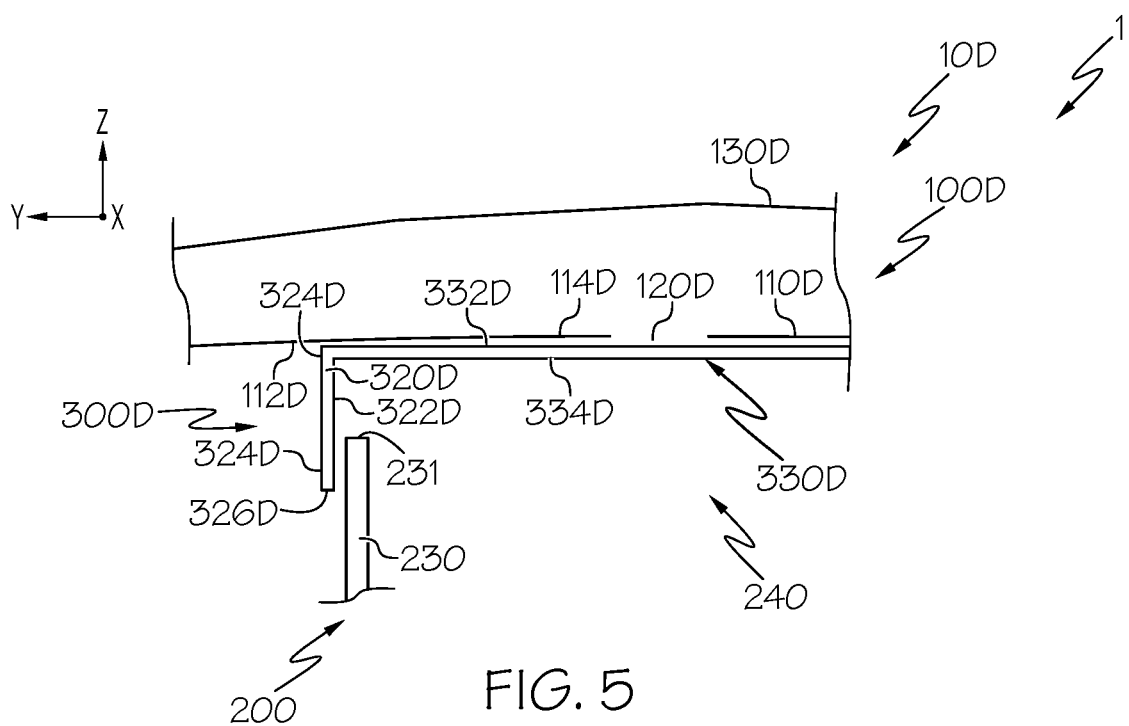
FIG. 5 depicts a partial cross sectional view of the modified vehicle frunk assembly taken along the line 5-5 of FIG. 4 according to one or more embodiments shown and described herein.

Referring to FIG. 5, in embodiments, the base wall 330D disposed between the hood inner panel 110 and the upper edge 231 of the side wall 230 of the frunk housing 200. For example, the base wall 330D may be disposed on the inner surface 112D of the hood inner panel 110D and extend across the frunk housing 200 to cover the entire storage space 240 from above when the hood 100D is in the closed position. In embodiments, the base wall 330D and may constitute a cover for the frunk housing 200 disposed over the storage space 240 to cover the frunk housing 200 when the hood 100 is in the closed position. The base wall 330D (e.g., the cover) may cover the openings 120 to cover the storage space 240 from the surrounding environment. Otherwise, debris and/or fluids could enter the storage space 240 through the openings 120D.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle frunk assembly, comprising:
a frunk housing having a bottom wall and a side wall having an interior surface and an opposite exterior surface, the interior surface of the side wall and the bottom wall define a storage space;
a hood moveable between an open position and a closed position, the hood having a hood inner panel; and
a sealing flange extending outwardly from the hood inner panel, the sealing flange having an inner surface and an outer surface, the sealing flange configured to bound at least a portion of the side wall such that the inner surface of the sealing flange faces the exterior surface of the side wall to form a seal between the hood and the frunk housing when the hood is in the closed position.

2. The vehicle frunk assembly of claim 1, wherein:
the side wall includes an upper edge spaced apart from the hood inner panel, and
the sealing flange is configured to move with respect to the upper edge of the side wall upon an application of a force on the hood.

3. The vehicle frunk assembly of claim 2, wherein:
the sealing flange includes a base wall coupled to the hood inner panel, and
the sealing flange extends outwardly from the base wall.

4. The vehicle frunk assembly of claim 3, wherein:
the base wall and the sealing flange form a cover that covers the storage space when the hood is in the closed position.

5. The vehicle frunk assembly of claim 3, wherein:
the base wall is provided on the hood inner panel so as to bound an exterior of the side wall.

6. The vehicle frunk assembly of claim 3, wherein:
an upper edge portion of the side wall is angled toward the storage space, and
the sealing flange is configured to be angled so as to conform with the upper edge portion.

7. The vehicle frunk assembly of claim 3, wherein:
the base wall of the sealing flange is disposed between the hood inner panel and the upper edge of the side wall.

8. The vehicle frunk assembly of claim 3, wherein:
a seal member is disposed on at least one of the inner surface of the sealing flange and the exterior surface of the side wall.

9. The vehicle frunk assembly of claim 8, wherein:
the seal member is a bulb seal.

10. The vehicle frunk assembly of claim 8, wherein:
the seal member includes a plurality of seal members, at least one seal member is disposed on the inner surface of the sealing flange and at least one seal member is disposed on the exterior surface of the side wall.

* * * * *

UNITED STATES PATENT AND TRADEMARK OFFICE
CERTIFICATE OF CORRECTION

| | | |
|---|---|---|
| PATENT NO. | : 12,441,169 B1 | Page 1 of 1 |
| APPLICATION NO. | : 18/185688 | |
| DATED | : October 14, 2025 | |
| INVENTOR(S) | : Jeremiah T. Hammer et al. | |

It is certified that error appears in the above-identified patent and that said Letters Patent is hereby corrected as shown below:

On the Title Page

Item (73), assignee 2, city, delete "Toyota (JP)" and insert --Toyota-shi Aichi-ken (JP)--, therefor.

In the Specification

In Column 1, Line(s) 30, delete "positon" and insert --position--, therefor.

In Column 2, Line(s) 20 & 21, delete "vehicles vehicle" and insert --vehicles--, therefor.

In Column 2, Line(s) 24, delete "Thee" and insert --The--, therefor.

In Column 2, Line(s) 27, before "and the frunk", delete "of the hood,".

In Column 2, Line(s) 32, after "with respect", delete "with".

In Column 3, Line(s) 46, after "positioned", delete "to" and insert --so--, therefor.

In Column 3, Line(s) 54, after "includes", delete "has".

In Column 4, Line(s) 2, after "formed", delete "to".

In Column 4, Line(s) 7, before "bound", insert --to--.

In Column 4, Line(s) 39, delete "230." and insert --230--, therefor.

In Column 6, Line(s) 50, after "330D", delete "and".

Signed and Sealed this
Twenty-third Day of December, 2025

John A. Squires
*Director of the United States Patent and Trademark Office*